Sept. 29, 1931.  W. C. BANKER  1,825,500
WINDMILL
Filed Feb. 28, 1930  3 Sheets-Sheet 2
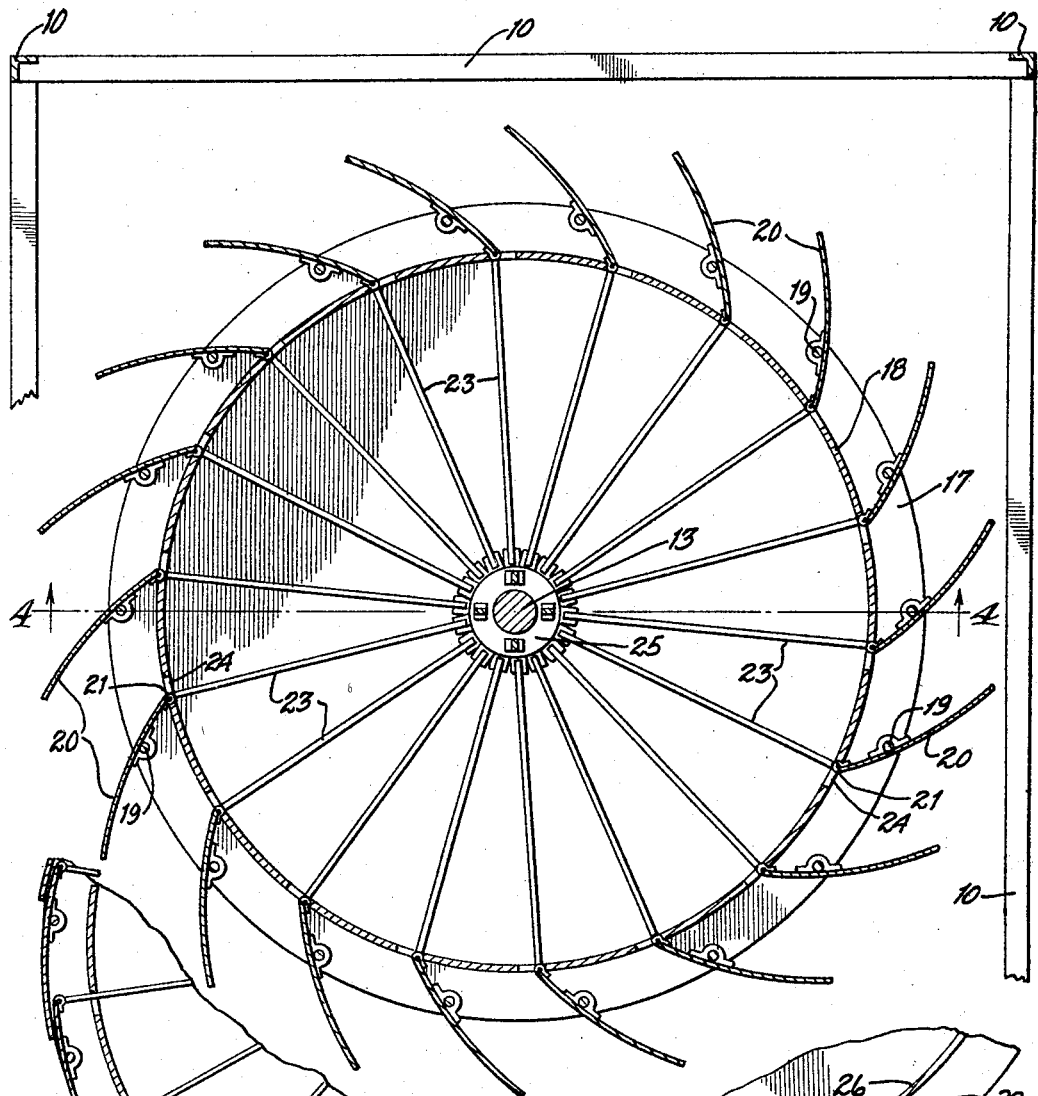
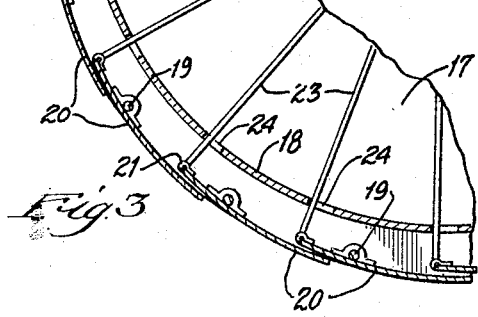

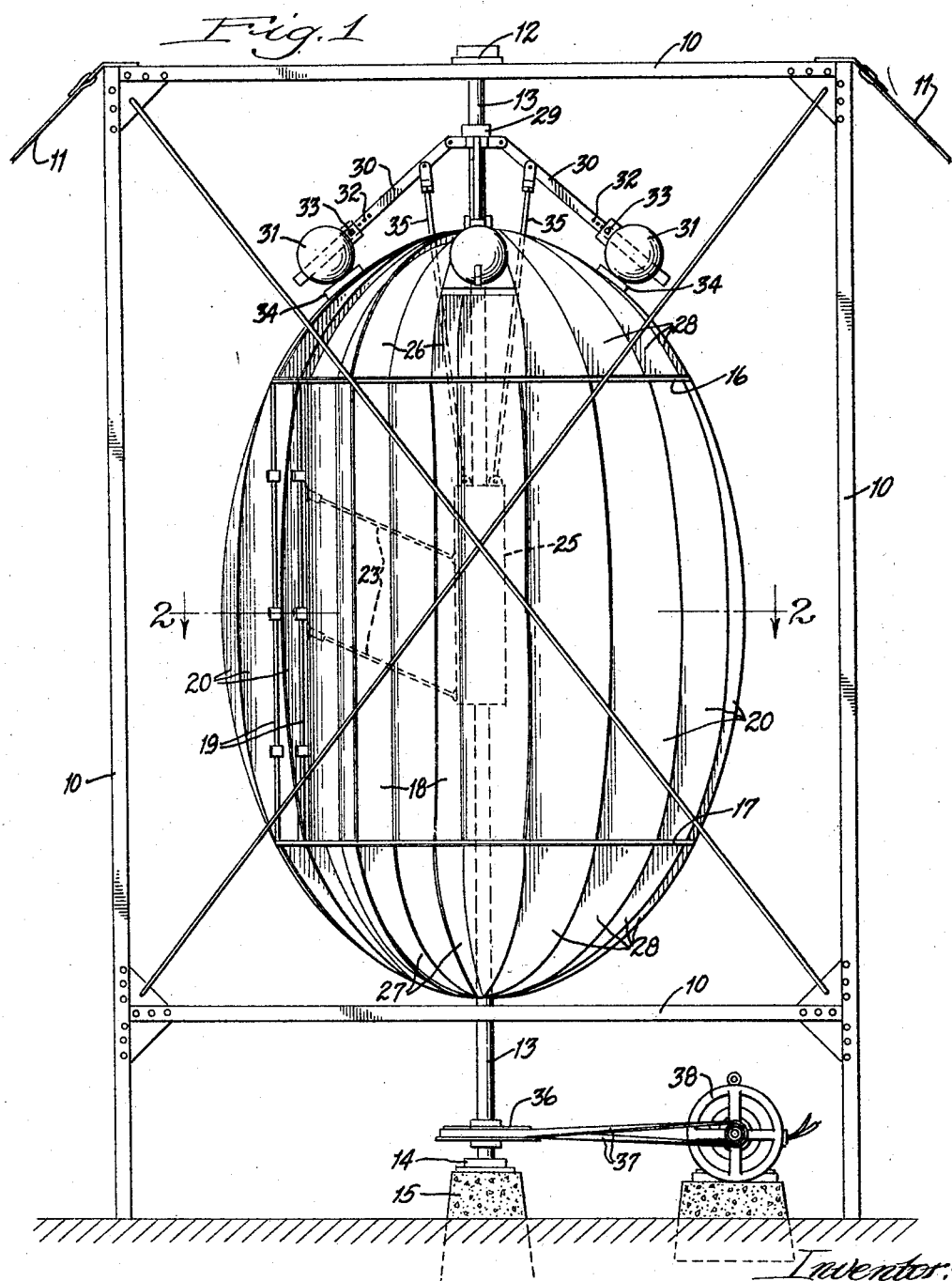

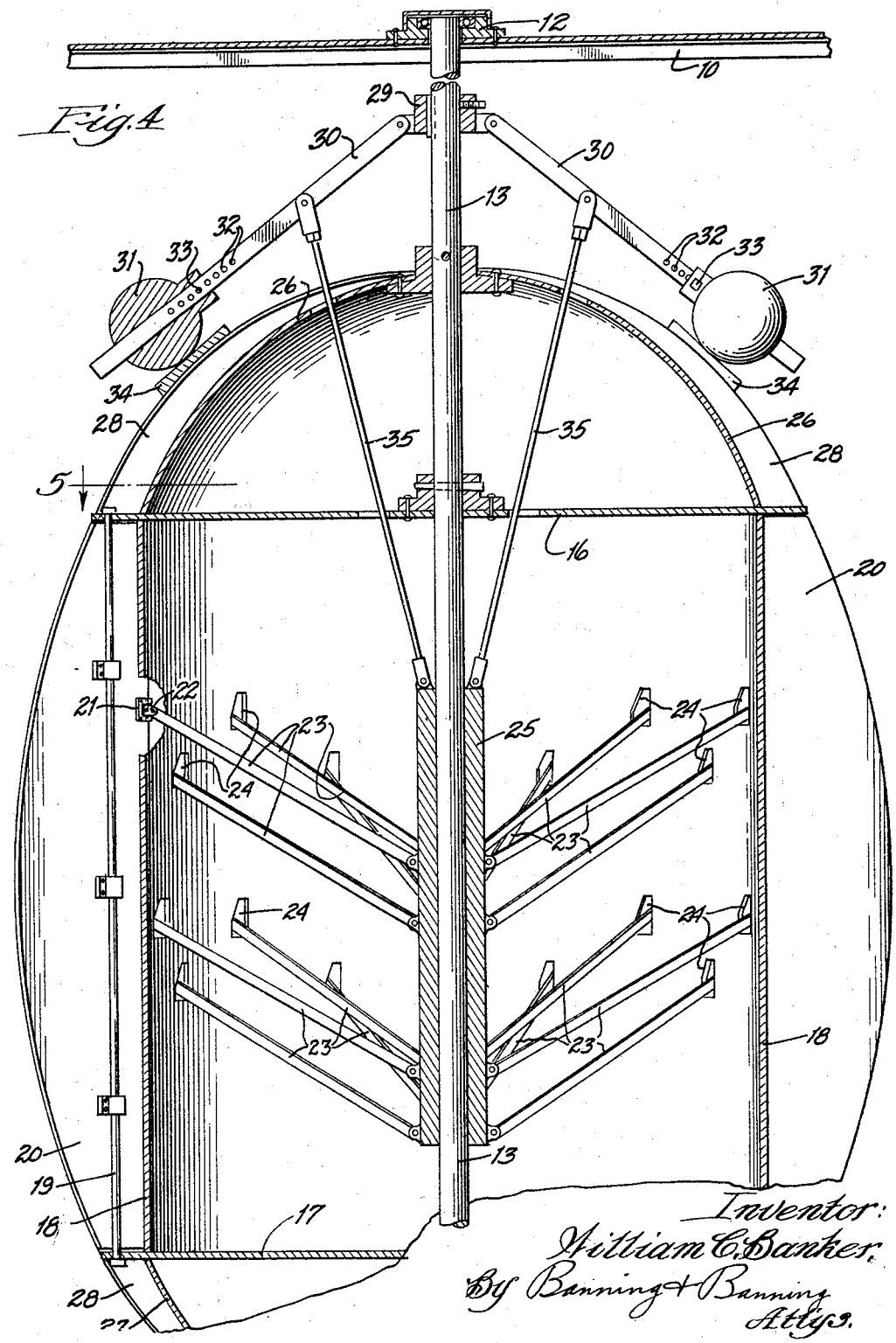

Patented Sept. 29, 1931

1,825,500

UNITED STATES PATENT OFFICE

WILLIAM C. BANKER, OF CHAPIN, IOWA

WINDMILL

Application filed February 28, 1930. Serial No. 432,021.

This invention relates to windmills, and has for its principal object to provide a windmill having a novel construction and capabilities.

A further object of the invention is to provide a windmill which includes governing mechanism to protect the same during excessive winds. These and other objects will be readily understood from the following description of a preferred embodiment, taken in conjunction with the accompanying drawings, in which—

Figure 1 is an elevation of a preferred embodiment of the invention,

Fig. 2 is a sectional view taken on the line 2—2 of Fig. 1,

Fig. 3 is a detail view similar to Fig. 2, with the vanes in a different location, Fig. 4 is a sectional detail on the line 4—4 of Fig. 2, and Fig. 5 is a sectional detail on the line 5 of Fig. 4.

Referring to the drawings, the mill comprises a frame 10 which may suitably be built from angle iron and provided with suitable stays to maintain same rigid. The frame is firmly anchored to the ground and is provided with guy ropes 11 to prevent the mill from being blown over during wind storms.

The frame 10 carries the upper bearing 12 of the vertical main shaft 13, the lower bearing 14 of which is mounted on a suitable foundation 15. Rigidly mounted upon the shaft 13 are two horizontal heads 16 and 17, which are spaced apart and are connected by a cylinder 18 which is axially arranged with respect to the shaft 13. The heads 16 and 17 project beyond the cylinder 18 and are connected by a circumferential series of vertical bolts 19 which are freely rotatable and carry rigidly, vanes 20. The vanes 20 are curved in the horizontal plane as shown in Figs. 2 and 3, and are movable into the positions shown in these figures and into intermediate positions by mechanism which will be hereinafter described. The inner edges of the vanes 20 may suitably be straight, while the outer edges may be curved as shown in Fig. 4.

The inner edge of each vane 20 carries a bracket 21 which provides a vertical pivot for a connecting link 22 to which is pivotally connected a rod 23. The rods 23 pass through openings 24 in the cylinder 18 and are pivotally connected to a sleeve 25 slidably mounted upon the shaft 13. The pivots of the rods 23 are horizontal, and the openings 24 are so formed that they permit the movement of the rods in both the vertical and circumferential directions, which occur during operation as will be later described.

Above the head 16 I provide a dome 26 and below the head 17 I provide a similar dome 27, which domes are rigidly secured to the heads 16 and 17 and to the shaft 13. On the exterior of said domes I provide circumferential series of vanes 28 which are preferably curved in horizontal planes and are described at an angle to radial direction, the direction of the vanes 28 corresponding to that of the vanes 20 in the position shown in Fig. 2. The vanes 28 are rigidly mounted upon the domes 26 and 27 and the heads 16 and 17. Above the dome 26 and the vanes 28 mounted thereon, there is rigidly mounted upon the shaft 13 a collar 29 which provides pivots for rods 30 which carry weights 31 near their free ends. Any suitable number of such rods and weights may be employed, but I have found that four are sufficient. The weights 31 are slidably mounted upon the rods 30 and may be adjusted to suitable position thereon, for example, by means of a series of openings 32 provided in the rods and screws 33 carried by the weights 31. Plates 34 may be mounted upon the vanes 28 of the dome 26 to support the weights 31 in their lowermost position. Links 35 connect the sleeve 25 to intermediate points of the rods 30, said links passing through openings in the head 16 and dome 26, which are sufficiently large to accommodate the movements of said links. The links 35 are pivotally connected to the sleeve 25 and rods 30.

The windmill may be employed as a source of power for any desired work. For example, the shaft 13 may be provided with a pulley 36 over which runs a belt 37 which operates a dynamo 38.

When the machine is exposed to a relatively moderate wind the relative positions of the movable parts are as shown in Figs. 1, 2 and 4. In this condition the circumferential series of vanes 20 together with the vanes 28 form pockets which catch the wind and effect rotation of the shaft 13 irrespective of the direction of the wind or changes of its direction. When, however, the wind is excessive, the weights 31 will tend to move upwardly towards the level of the collar 29, the sleeve 25 will be drawn upwardly and the rods 23 will force the inner edges of the vanes 20 outwardly and result in the reduction of the force applied by the wind thereon. When still greater velocities are attained, the upward movement of the sleeve 25 is sufficient to cause the vanes 20 to assume the position shown in Fig. 3. When this condition is attained, the drive of the shaft 13 is derived exclusively from the vanes 28.

As the wind lessens, the weights 31 and the other movable parts resume the positions shown in Figs. 1, 2 and 4.

Although the invention has been described in connection with the details of a specific embodiment thereof, it is to be understood that such details are not intended to be limitative of the invention except in so far as they are included in the accompanying claims.

I claim:

1. A windmill comprising a shaft, a drum mounted axially thereon, a set of vanes rigidly mounted on the top and bottom of said drum and located at an angle to the radial direction, vanes pivoted on axes parallel to the shaft on the exterior of the drum intermediate the two sets of rigid vanes, and adapted to be moved into positions at an angle to the radial direction so that they form pockets with the surface of the drum, a governor mounted on said shaft and comprising a member slidable on the shaft within the drum in accordance with variations of speed of rotation, and links connecting said member to said vanes whereby the resistance of the same is lessened when excessive speeds are attained.

2. A windmill comprising a shaft, a cylinder mounted thereon, domes mounted on the shaft at each end of the cylinder, vanes rigidly mounted on the domes, movable vanes mounted on the cylinder, and a governor adapted to control the movable vanes whereby the resistance of the same is lessened when excessive speeds are attained.

3. A windmill comprising a shaft, spaced heads secured on the shaft, a drum mounted axially with the shaft and lying between the heads, conoidal domes secured to the shaft adjacent each head, vanes rigidly mounted on the domes and heads, the vanes being located at an angle to the radial direction to form pockets which are wide at the base of the dome and recede toward the shaft, rods extending between the heads and parallel with the shaft, movable vanes attached near one edge to the rods, the vanes having an arcuate free edge so that when the movable vanes are in their outermost adjusted position they form continuations of the fixed vanes in a general ovoid contour the whole of which is exposed to the air, a governor mounted on the shaft, a slidable sleeve on the shaft connected to the governor, and links connecting the sleeve with the vanes whereby the latter are deflected when the speed becomes excessive.

In testimony whereof, I have hereunto set my hand this 26 day of February, 1930.

WILLIAM C. BANKER.